United States Patent
Jetty et al.

(10) Patent No.: US 12,154,145 B2
(45) Date of Patent: Nov. 26, 2024

(54) SYSTEMS AND METHODS FOR ASSISTING WITH MERCHANDISE PURCHASES AT A RETAIL FACILITY

(71) Applicant: Walmart Apollo, LLC, Bentonville, AR (US)

(72) Inventors: Rajasekhar Jetty, Austin, TX (US); Yogananda Domlur Seetharama, Plano, TX (US); Maheshwar Ramakrishnan, Bangalore (IN); Ieshan A. Vaidya, Dallas, TX (US); Jaehyuk Choi, Dallas, TX (US); Chi-san Ho, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 202 days.

(21) Appl. No.: 17/871,061

(22) Filed: Jul. 22, 2022

(65) Prior Publication Data

US 2024/0029119 A1 Jan. 25, 2024

(51) Int. Cl.
*G06Q 30/00* (2023.01)
*G06Q 30/02* (2023.01)
*G06Q 30/0251* (2023.01)
*G06Q 30/0601* (2023.01)

(52) U.S. Cl.
CPC ..... *G06Q 30/0281* (2013.01); *G06Q 30/0255* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 6,317,722 B1 | 11/2001 | Jacobi | |
| 8,438,052 B1 * | 5/2013 | Chanda | G06Q 30/0207 705/7.11 |
| 10,776,723 B1 * | 9/2020 | Hopkins | G06Q 30/0255 |
| 11,263,682 B2 | 3/2022 | Karmakar | |

(Continued)

OTHER PUBLICATIONS

Pre-Checkout Offer—Cartflows https://web.archive.org/web/20220122182054/https://cartflows.com/features/pre-checkout-offer/ (Year: 2022).*

(Continued)

*Primary Examiner* — Christopher Stroud
(74) *Attorney, Agent, or Firm* — Foley IP Law, PLLC

(57) ABSTRACT

There are provided systems and methods for assisting consumers with merchandise purchases at a retail facility. The system may include an application to facilitate purchase of merchandise items at a retail facility, which may be executed on a user's mobile device. The application may receive input regarding items scanned at the retail facility using the mobile device and may facilitate payment for the scanned items by the mobile device. The system may also include a control circuit that: accesses database(s) to determine the user's purchase history; determines candidate items to be considered for recommendation to the user; computes a ranking of candidate items based on a weighted combination of recency and frequency of purchases of each candidate item, merchandise category of other candidate items, and price of the candidate item; and causes the display on the mobile device of additional recommended merchandise items for purchase by the user.

20 Claims, 12 Drawing Sheets

(56) References Cited

U.S. PATENT DOCUMENTS

| | | | | |
|---|---|---|---|---|
| 11,468,472 | B2* | 10/2022 | Zoldi | G06Q 30/0269 |
| 2008/0306820 | A1* | 12/2008 | Passmore | G06Q 30/02 |
| | | | | 705/14.66 |
| 2009/0055257 | A1* | 2/2009 | Chien | G06Q 30/02 |
| | | | | 705/14.69 |
| 2009/0259621 | A1* | 10/2009 | Svendsen | G06F 16/48 |
| 2010/0257037 | A1* | 10/2010 | Matz | G06Q 30/0211 |
| | | | | 709/206 |
| 2012/0197732 | A1* | 8/2012 | Shen | G06Q 30/02 |
| | | | | 705/14.66 |
| 2013/0117130 | A1* | 5/2013 | Dyor | G06Q 30/06 |
| | | | | 705/14.69 |
| 2014/0214562 | A1* | 7/2014 | Cancro | G06Q 30/0631 |
| | | | | 705/16 |
| 2014/0229322 | A1* | 8/2014 | Ranganath | G06Q 50/01 |
| | | | | 705/26.7 |
| 2015/0220836 | A1* | 8/2015 | Wilson | G06Q 30/0269 |
| | | | | 706/46 |
| 2017/0262926 | A1* | 9/2017 | High | G06K 7/10712 |
| 2018/0174188 | A1* | 6/2018 | Wilkinson | G06Q 30/0242 |
| 2018/0330417 | A1* | 11/2018 | Wollmer | G06Q 40/03 |
| 2019/0019237 | A1* | 1/2019 | Karmakar | G06Q 30/0631 |
| 2019/0287093 | A1* | 9/2019 | Perry | G06Q 30/0267 |
| 2020/0320561 | A1* | 10/2020 | O'Brien | G06Q 30/0222 |
| 2021/0118037 | A1* | 4/2021 | Bradley | G06Q 30/0631 |
| 2021/0133852 | A1 | 5/2021 | Vauthey | |
| 2022/0156797 | A1* | 5/2022 | Paiement | G06Q 30/0269 |
| 2024/0078586 | A1* | 3/2024 | Wilson | G06Q 30/0282 |

OTHER PUBLICATIONS

Pre-checkout Offers With Cartflows—Cartflows https://www.youtube.com/watch?v=1ATR0a0dEU0 (Year: 2021).*

Vigo, Gidi; "An Introduction to Affinity-Based Recommendations"; <https://www.dynamicyield.com/lesson/affinity-based-recommendations>; retrieved by Jul. 6, 2022; pp. 1-6.

Hu, Haoji; "Modeling Personalized Item Frequency Information for Next-basket Recommendation." <extension://elhekieabhbkpmcefcoobjddigjcaadp/https://arxiv.org/pdf/2006.00556v1.pdf>; May 31, 2020; pp. 1-10.

Yu, Feng; "A Dynamic Recurrent Model for Next Basket Recommendation"; <https://cseweb.ucsd.edu/classes/fa17/cse291-b/reading/A%20Dynamic%20Recurrent%20Model%20for%20Next%20Basket%20Recommendation.pdf>; Jul. 7, 2016; pp. 1-4.

Wan, Mengting; "Representing and Recommending Shopping Baskets with Complementarity, Compatibility, and Loyalty"; <https://cseweb.ucsd.edu/~jmcauley/pdfs/cikm18a.pdf>; Oct. 17, 2018; pp. 1-10.

Repko, Melissa; "Walmart CEO Doug McMillon Says Inflation is Opportunity to Beat Competitors on Price"; <https://www.cnbc.com/2021/11/16/walmart-ceo-doug-mcmillon-inflation-is-opportunity-to-win-customers.html>; Nov. 16, 2021; pp. 1-8.

Carbonell, Jaime G.; "The Use of MMR, Diversity-Based Reranking for Reordering Documents and Producing Summaries"; <https://www.cs.cmu.edu/~jgc/publication/The_Use_MMR_Diversity_Based_LTMIR_1998.pdf>; Jun. 27, 1999; pp. 1-3.

* cited by examiner

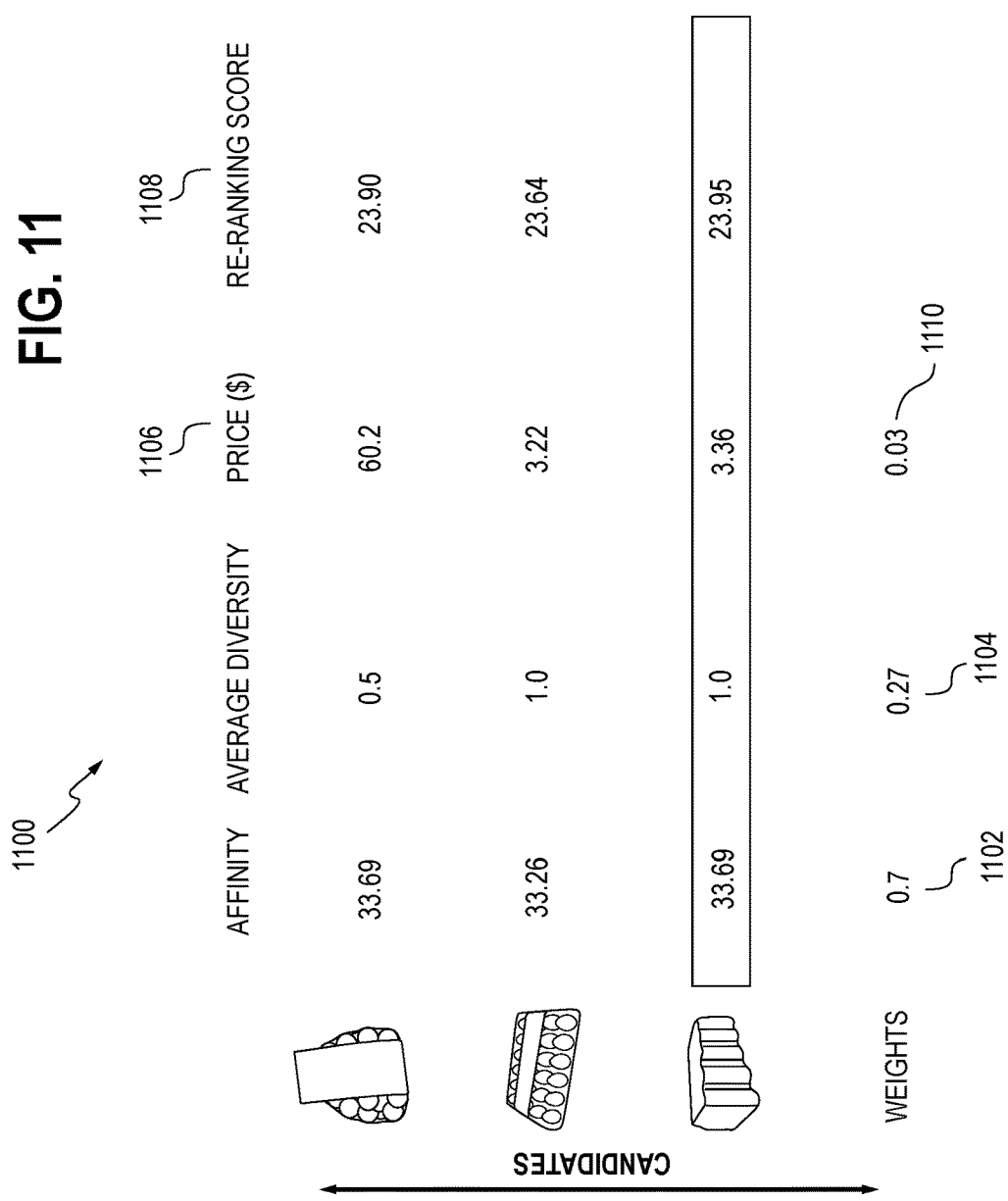

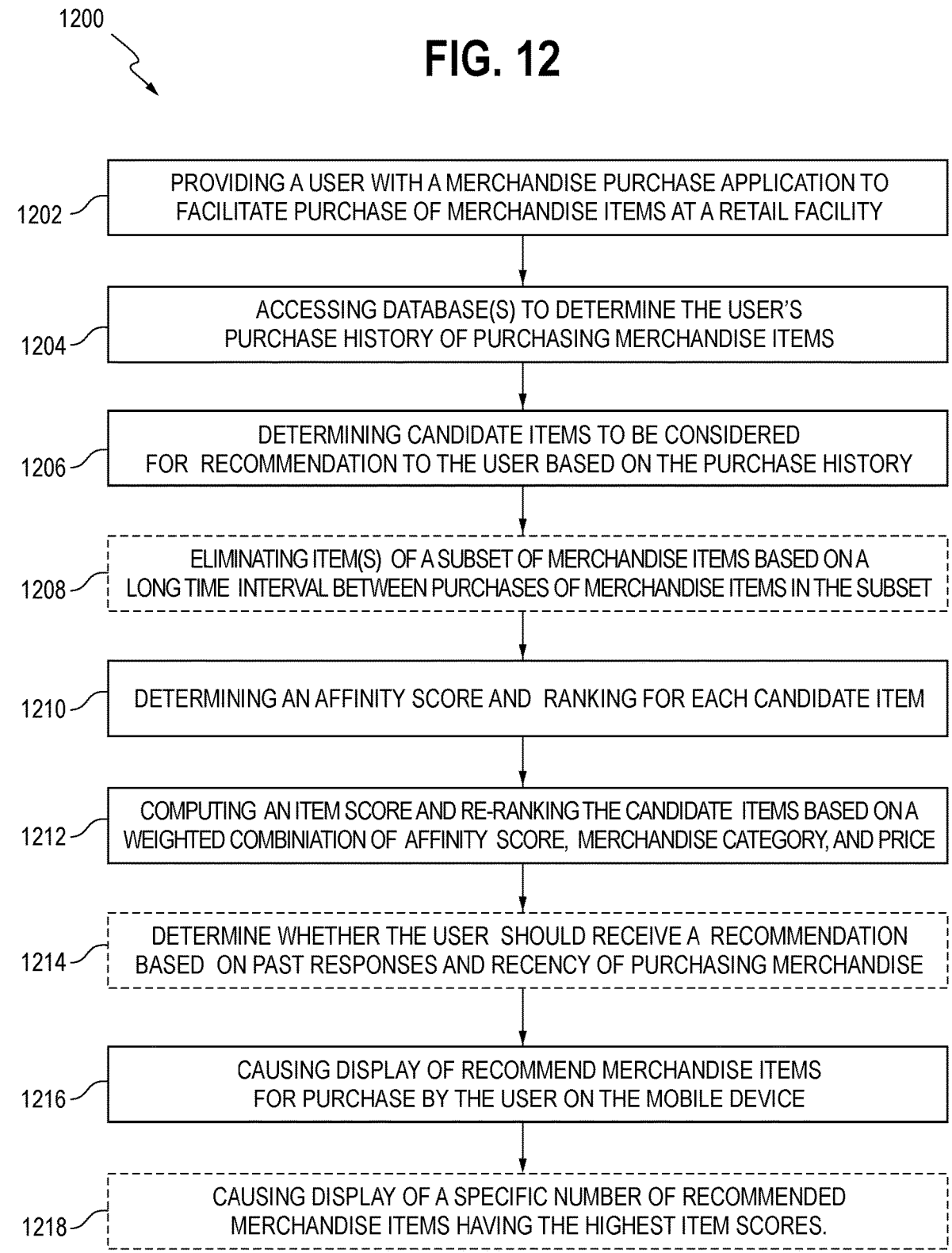

SYSTEMS AND METHODS FOR ASSISTING WITH MERCHANDISE PURCHASES AT A RETAIL FACILITY

TECHNICAL FIELD

This invention relates generally to merchandise purchases, and more particularly, to merchandise purchases at a retail facility.

BACKGROUND

Consumers often schedule time to make merchandise purchases at a retail facility (such as a store). For example, consumers may periodically arrange for grocery shopping trips to provide groceries for their household and family for the near future. Consumers, however, do not have unlimited amounts of time, and other duties place demands on their available time. It is therefore desirable for consumers to be able to make their merchandise purchases in an efficient manner so as to avoid an immediate return trip to the retail facility to purchase overlooked or forgotten items.

Increasingly, consumers are using their mobile devices to assist with their purchases at a retail facility. Consumers may use their mobile devices to scan barcodes (or other identifiers) on merchandise and may thereby track their purchases in an online shopping cart. In addition, for example, at the end of the shopping trip, consumers may then pay for the accumulated merchandise via their mobile device. After the consumer has made his or her purchases, it would be desirable for the consumer to receive a recommendation of additional recommended merchandise items for purchase that the consumer may be forgetting and that might require an immediate return trip to the retail facility.

BRIEF DESCRIPTION OF THE DRAWINGS

Disclosed herein are embodiments of systems and methods for providing automatic invoice adjustment. This description includes drawings, wherein:

FIG. 11 comprises a schematic diagram in accordance with some embodiments; and

FIG. 12 comprises a flow diagram in accordance with some embodiments.

Figure 1:
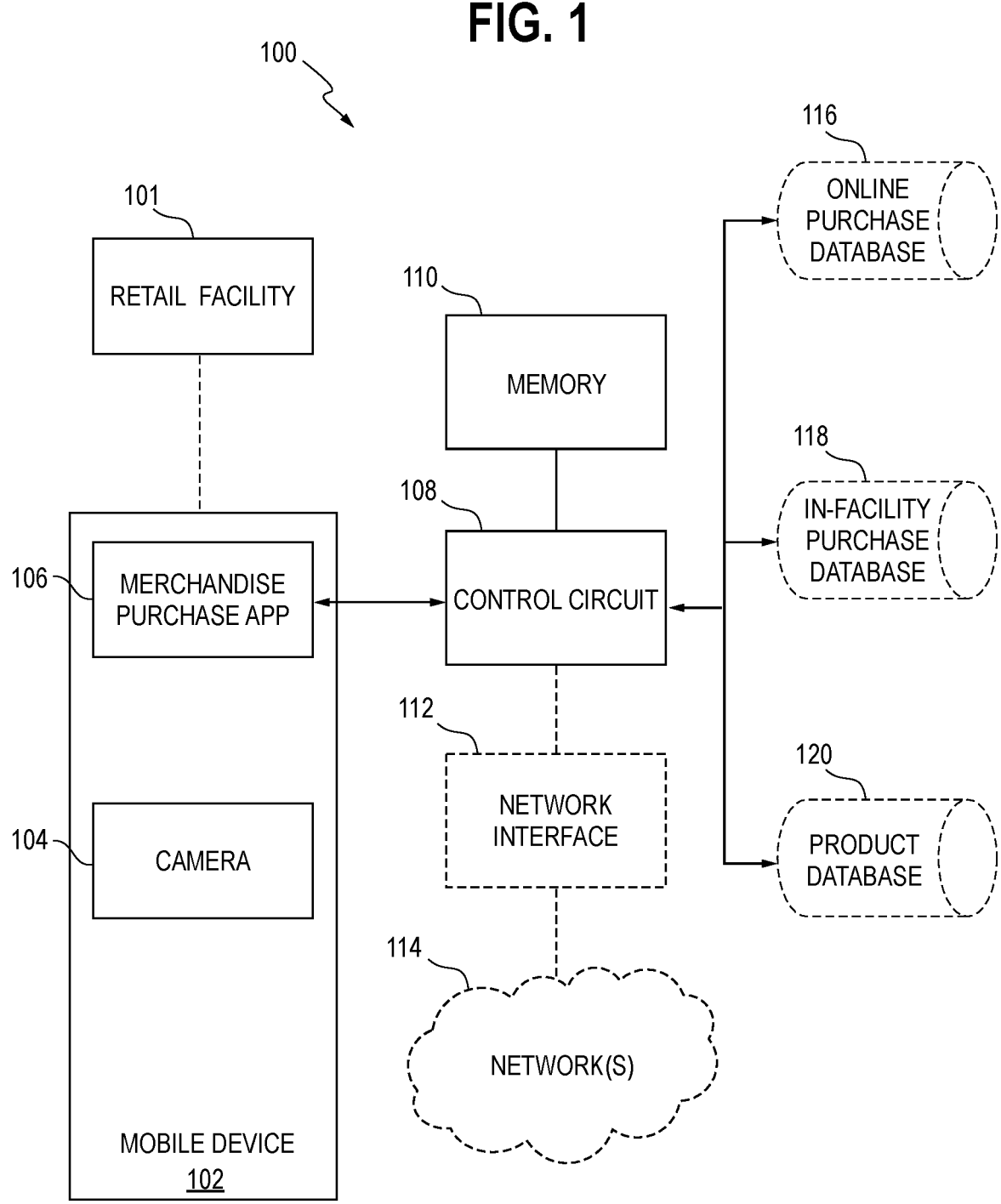
FIG. 1 comprises a block diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for use in assisting a user with merchandise purchases at a retail facility. In one form, the system includes a merchandise purchase application to facilitate purchase of merchandise items at a retail facility, the merchandise purchase application configured to be executed by a user's mobile device to receive input regarding merchandise items scanned at the retail facility using the mobile device, and to facilitate payment for the scanned merchandise items by the mobile device at the retail facility. The system further includes a control circuit in communication with the merchandise purchase application, the control circuit configured to: access at least one database to determine the user's purchase history of purchasing merchandise items; determine candidate items sold at the retail facility to be considered for recommendation to the user based on the purchase history; determine an affinity score and ranking for each candidate item, the affinity score and ranking being determined by recency and frequency of purchase of the candidate items; compute an item score and re-rank the candidate items, the item score being determined by a weighted combination of the affinity score of the item, merchandise category of other candidate items, and price of the item; and cause to display recommended merchandise items for purchase by the user on the mobile device unless a determination has been made that the user should not receive the recommendation.

In some implementations, in the system, the control circuit is configured to eliminate from the candidate items one or more items of a predetermined subset of merchandise items that the user is unlikely to purchase based on a long time interval between purchases of each merchandise item in the predetermined subset of merchandise items. In some implementations, the control circuit is configured to determine whether the user should receive a recommendation based on past responses to recommendations and recency of purchasing merchandise. In some implementations, the at least one database includes a plurality of types of past merchandise purchases, the types comprising online purchases that were delivered to the user, in-facility purchases using the merchandise purchase application, in-facility purchases using a point-of-sale system other than the merchandise purchase application, and purchases that were ordered and picked up at retail facilities. In some implementations, the control circuit is configured to determine the affinity score of each item by a decaying, non-linear function that provides disproportionate weight to candidate items purchased more recently than other candidate items. In some implementations, the computation of the item score based on the merchandise category of other candidate items is weighted to decrease the item score of a lower ranked candidate item that is in the same merchandise category as a higher ranked candidate item relative to other candidate items without this characteristic. In some implementations, the control circuit is configured to compute the item score of each item by applying a greatest weight to the affinity score of the item, an intermediate weight to the merchandise category characteristic, and a least weight to the price of the item. In some implementations, the control circuit is configured to: access a database identifying a location in the retail facility where each recommended merchandise item is stocked; and cause to display the location of each recommended merchandise item in the retail facility when causing to display the recommended merchandise items for purchase by the user on the mobile device. In some implementations, the control circuit is configured to cause to display a predetermined number of recommended merchandise items corresponding to the candidate items receiving highest item scores. In some implementations, the control is configured to: determine that the user has not responded to a predetermined number of past recommendations transmitted to the user's mobile device; and block transmission of recommended merchandise items to the mobile device for a predetermined amount of time.

In another form, there is provided a method for assisting with in-facility purchases comprising: providing a user with a merchandise purchase application to facilitate purchase of merchandise items at a retail facility, the merchandise purchase application configured to be executed by a user's mobile device, to receive input regarding merchandise items scanned at the retail facility using the mobile device, and to facilitate payment for the scanned merchandise items by the mobile device at the retail facility; and by a control circuit in communication with the merchandise purchase application: accessing at least one database to determine the user's purchase history of purchasing merchandise items; determining candidate items sold at the retail facility to be considered for recommendation to the user based on the purchase history; determining an affinity score and ranking for each candidate item, the affinity score and ranking being determined by recency and frequency of purchase of the candidate items; computing an item score and re-ranking the candidate items, the item score being determined by a weighted combination of the affinity score of the item, merchandise category of other candidate items, and price of the item; causing to display recommended merchandise items for purchase by the user on the mobile device unless a determination has been made that the user should not receive the recommendation.

As an overview, without limitation, this disclosure is directed generally to providing personalized product recommendations during the checkout process on a merchandise purchase application (or "app") executed on a mobile device. In one aspect, the disclosure may consider a purchase history of the user collected across all available purchase channels and uses a scoring approach to understand the customer's potential needs and predict the next items to be added to the shopping basket. This disclosure addresses a number of features including, without limitation: 1) affinity scoring based on recency and frequency of purchase of merchandise items; 2) infusion of category diversity of recommended merchandise items; 3) price driven reranking; 4) use of an interpurchase interval to eliminate products that are less interesting to the user; and 5) recommendation snoozing that selectively disables the recommendations to particular individuals to reduce friction during the checkout process.

In one aspect, the system provides purchase recommendations to mobile device users (such as store customers or club members) using a merchandise purchase app while shopping in-person at retail facilities (such as stores or clubs). When the customer has made his or her in-facility purchases and is ready to check out, the system may suggest additional recommended purchases on the user's mobile device. The system may make use of a number of different data points to make the recommendations. Initially, the system may determine a list of candidate items that might be recommended based on affinity (recency and frequency of purchase of an item). This list may be determined after considering the customer's purchase history over some or all purchase channels, including past online purchases, in-store purchases, purchases that were ordered and picked up at stores, etc. The system may compute a decaying affinity score for each item by placing more weight on recently purchased items and then ranking the items. The system may then re-rank the items based on a weighted combination of affinity, category diversity, and pricing. Regarding category diversity, a lower ranked affinity item (such as oranges) that is in the same category (fruit) as a higher ranked affinity item (such as bananas) may be pushed down in ranking to promote diversity. The system may also take pricing into account.

In one aspect, the system may use additional features to modify the recommendations. The system may use interpurchase intervals to eliminate products that the customer will likely not be interested in based on the long interval between purchases of that item. For example, a customer purchased vitamins last month, and it may ordinarily take a customer six months to consume the vitamins. This product will be filtered out and not recommended. Also, the system may determine customers that should not receive recommendations (snoozing recommendations for a period of time). Generally, this might apply to customers who have regularly ignored recommendations in the past and who have shopped fairly recently. The snooze may last for a certain length of time, after which the recommendations may be reinstituted.

Referring to FIG. 1, there is shown a system 100 for assisting users with merchandise purchases at a retail facility 101. In this context, "retail facility" refers broadly to a store, club, or other business that engages in the routine sale of merchandise. It is generally contemplated that the user is using a mobile device 102 with a camera 104 to scan merchandise items that are to be purchased. After the user has scanned all of the merchandise items, the user proceeds to checkout and payment via the mobile device 102. At this stage, the user is prompted with personalized additional merchandise items that he or she may be interested in purchasing.

Figure 2:
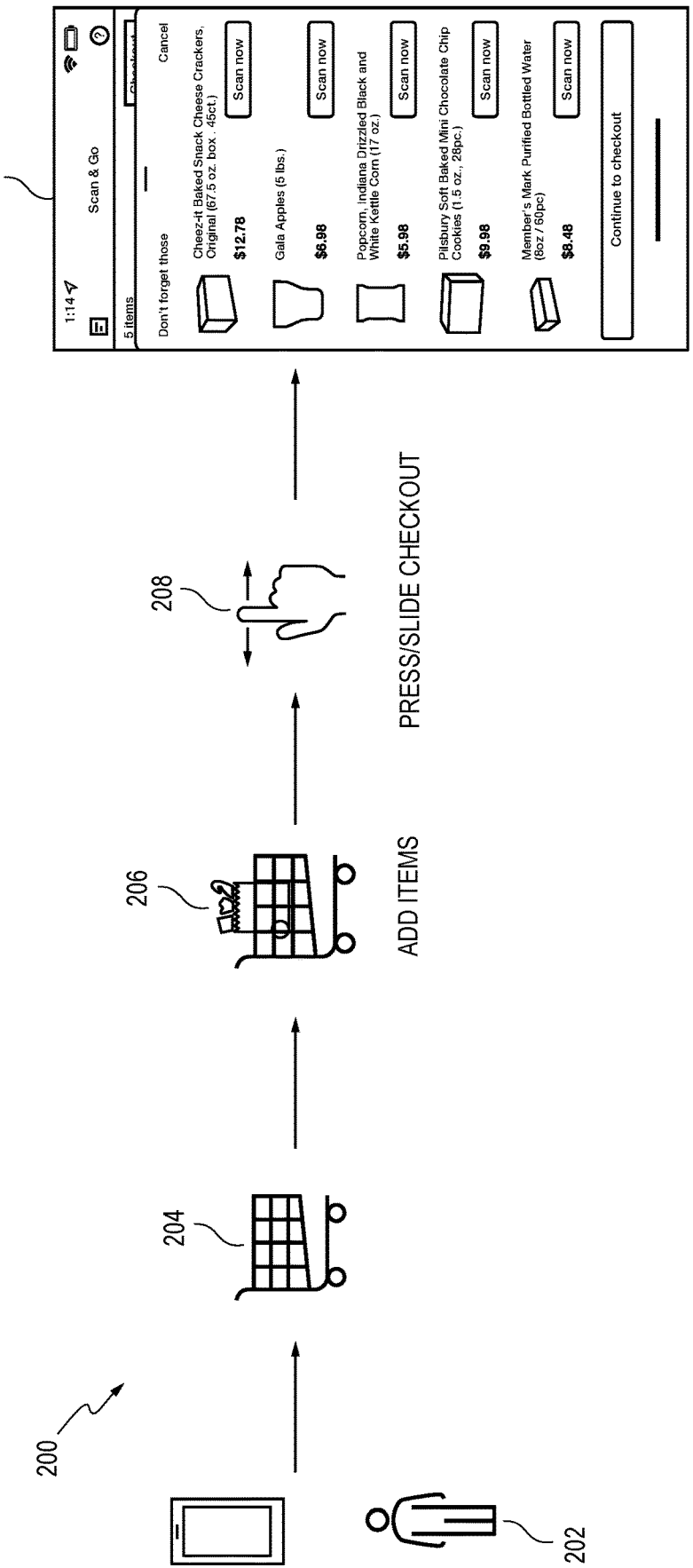
FIG. 2 comprises a screenshot in accordance with some embodiments.

FIG. 2 shows a schematic overview of the purchasing scheme 200. A user with a mobile device 202 arrives at the retail facility. The empty cart 204 represents both a physical cart that the user may be using at the retail facility, as well as an online cart or basket on the user's mobile device to which the user will add merchandise items. Merchandise items have been added to the cart 206. After the user finishes purchasing merchandise items, he or she indicates readiness to checkout 208 on the mobile device. Generally, at this stage, the user may receive additional recommended merchandise items 210 on the mobile device. As addressed below, in one form, these recommended merchandise items are items that the user has purchased in the past that the user may have forgotten to purchase during this shopping trip.

Referring to FIG. 1, the system 100 includes a merchandise purchase application ("app") 106 to facilitate the purchase of merchandise items at the retail facility 101. It is generally contemplated that the application 106 is made available to users by the retailer for use at the retail facility 101. It may be a standalone application or it may be one feature of a comprehensive application having a number of features and options. The merchandise purchase application 106 is configured to be executed on the user's mobile device 102. It may be downloaded to the mobile device 102, or it may be pre-installed on the mobile device 102. The application 106 receives input regarding merchandise items scanned using the mobile device 102. For example, the mobile device 102 may be equipped with a camera 104 that reads the barcode or universal product code (UPC) on the packaging of a merchandise item. The application 106 also facilitates payment for the scanned merchandise items by using the mobile device 102 at the retail facility 101.

Figure 3:
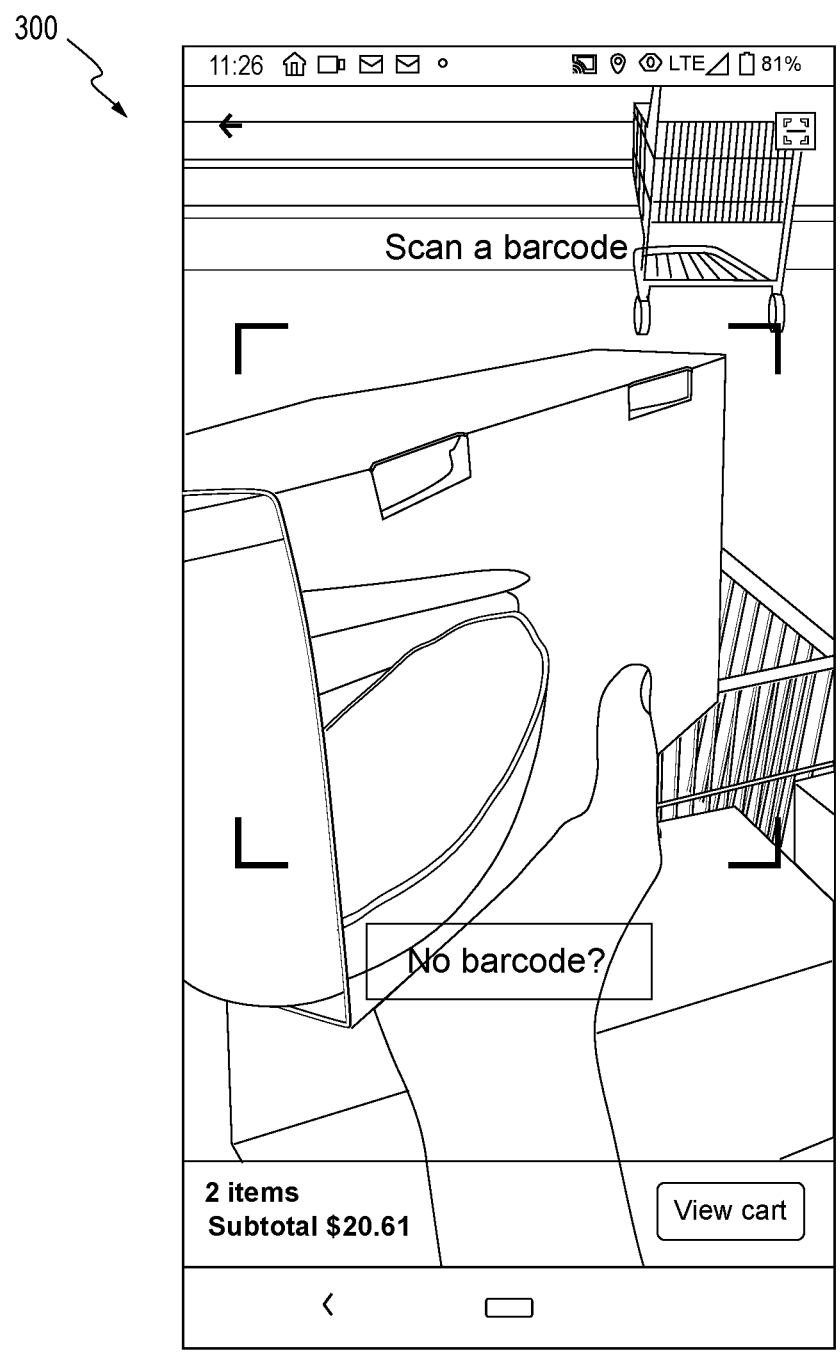
FIG. 3 comprises a screenshot in accordance with some embodiments.
Figure 4:
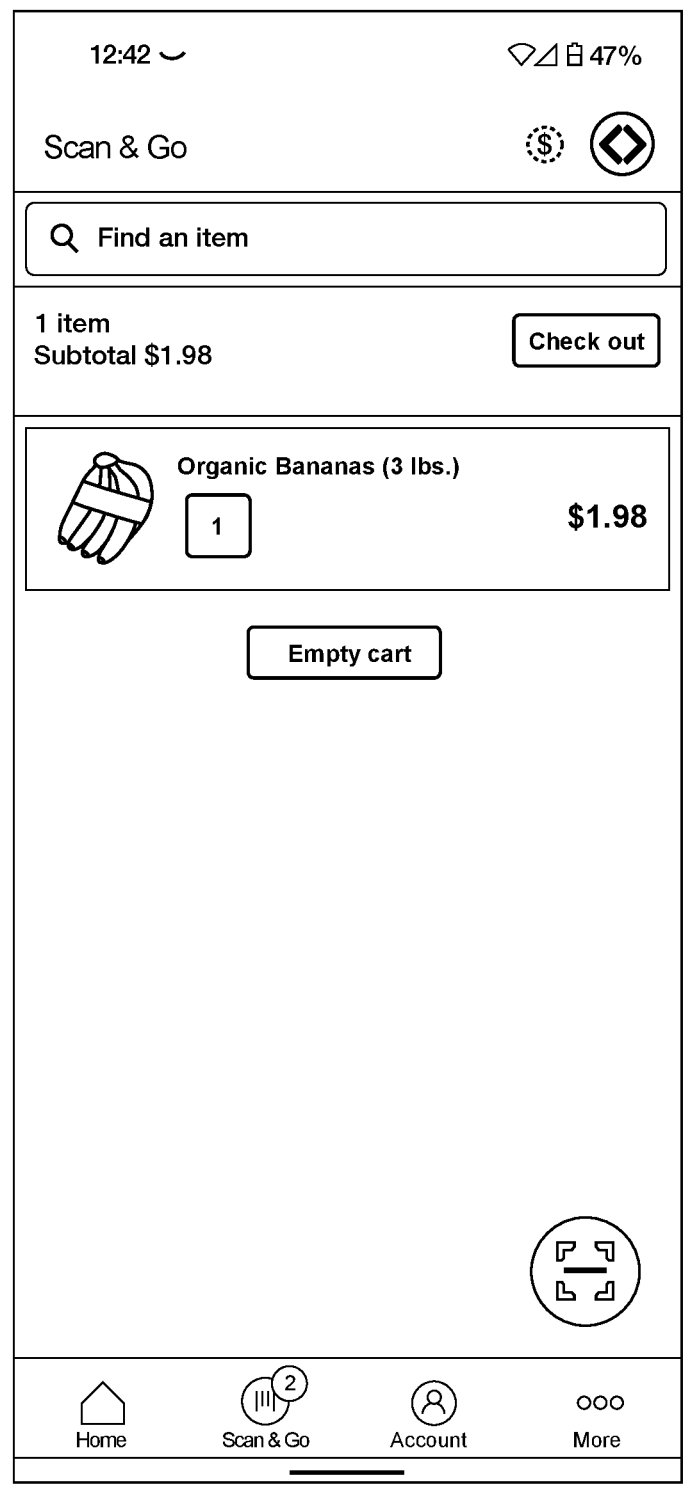
FIG. 4 comprises a screenshot in accordance with some embodiments.
Figure 5:
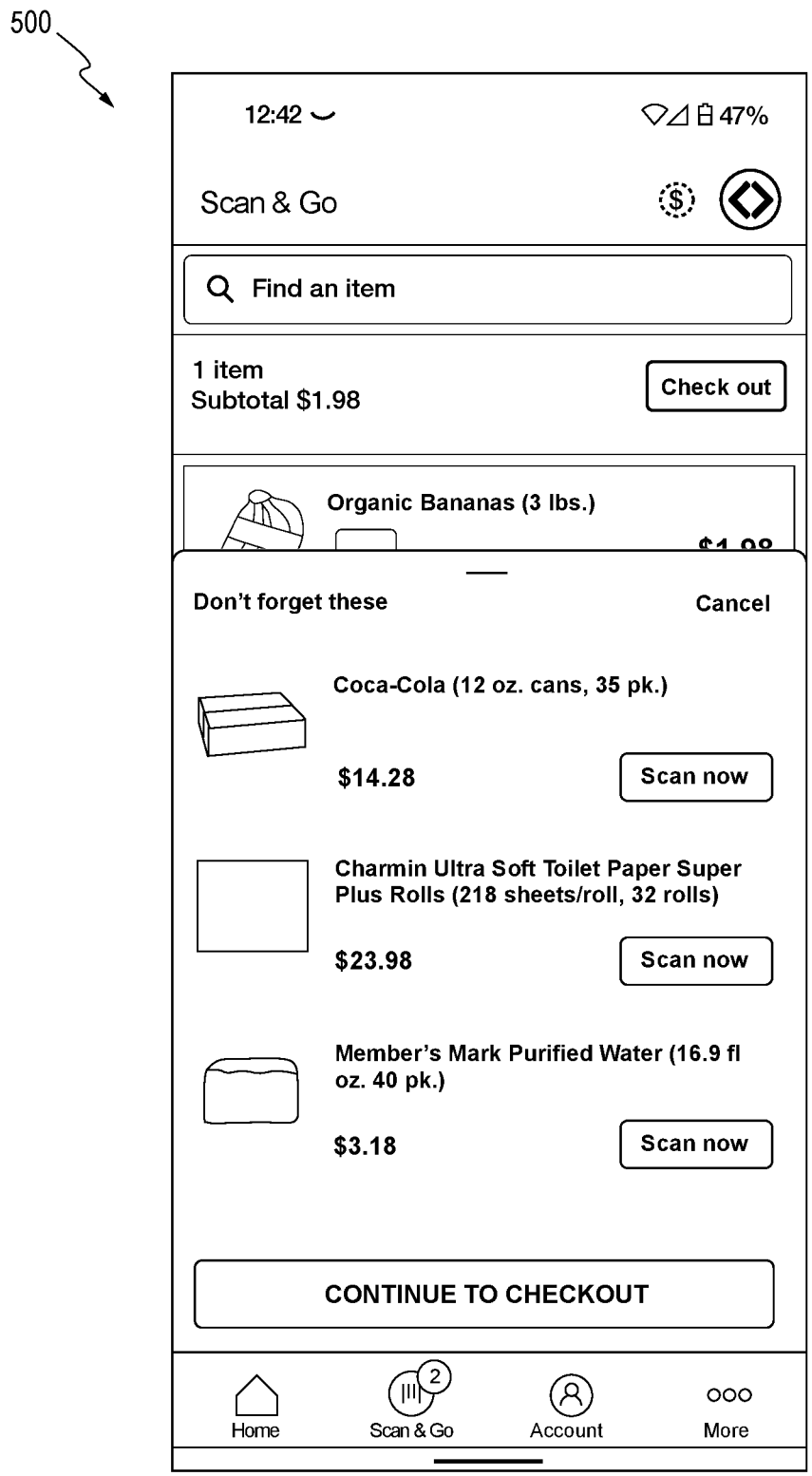
FIG. 5 comprises a screenshot in accordance with some embodiments.
Figure 6:
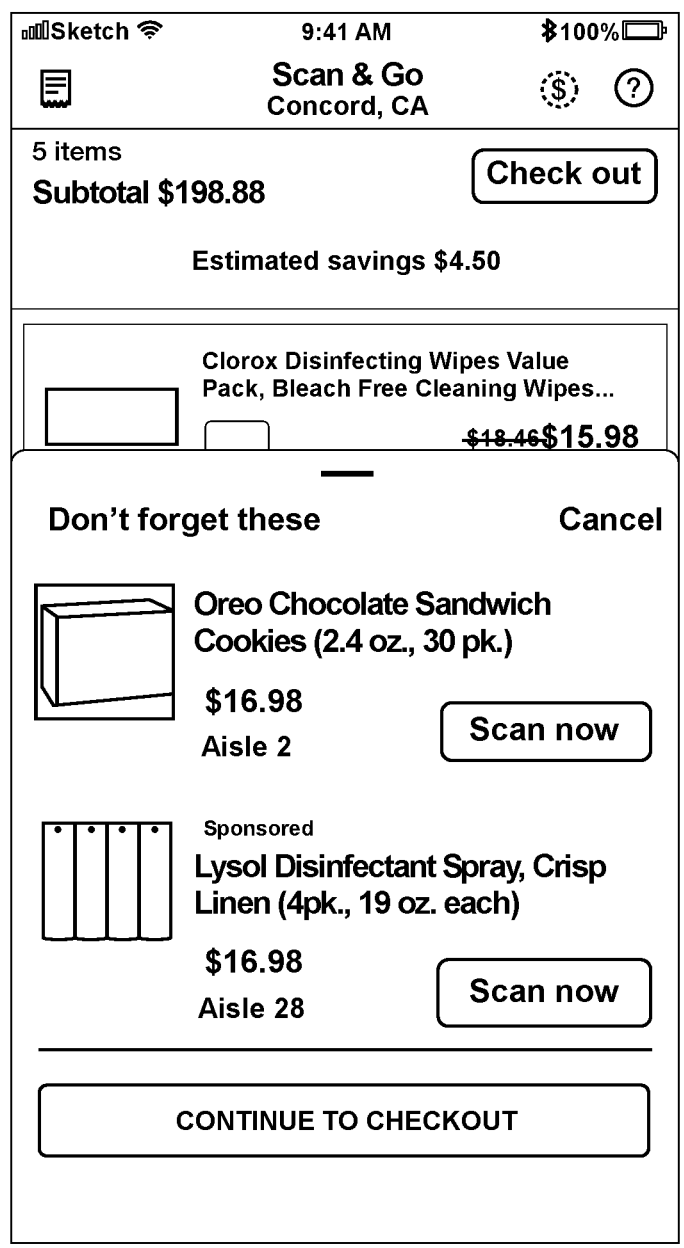
FIG. 6 comprises a screenshot in accordance with some embodiments.

FIGS. 3, 4, 5, and 6 show screenshots of several steps in the purchase and checkout process using the merchandise purchase application 106. FIG. 3 shows a screenshot 300 where the camera 104 of the mobile device 102 is being used to scan a merchandise item. FIG. 4 shows a screenshot 400 where a merchandise item (organic bananas) has been scanned and added to the online shopping cart. FIG. 5 shows a screenshot 500 of a recommendation at checkout of additional merchandise items that may be of interest to the user. In this example, the recommended additional items include a pack of carbonated soft drink cans, toilet paper rolls, and a pack of purified water containers. Each recommended additional item is provided with a brief description and a price. FIG. 6 shows a screenshot 600 of an alternative recommendation at checkout of additional merchandise items. In this version, in addition to a brief description and price of the recommended products (sandwich cookies and a disinfectant spray), each recommended product is also provided with the specific location (aisle) in the retail facility 101 where the recommended product can be found.

The system 100 also includes a control circuit 108 that is configured to perform certain operations in order to generate the additional recommended merchandise items. It is generally contemplated that the control circuit 108 is in communication with (or communicatively coupled to) the merchandise purchase application 106. In this regard, the control circuit 108 may act as a service that is called by the merchandise purchase application 106 during the user's shopping experience or at or around the time of checkout.

In this context, the term control circuit 108 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

As shown in FIG. 1, the control circuit 108 is coupled to a memory 110 and to a network interface 112 and wireless network(s) 114. The memory 110 can, for example, store non-transitorily computer instructions that cause the control circuit 108 to operate as described herein, when the instructions are executed, as is well known in the art. Further, the network interface 112 may enable the control circuit 108 to communicate with other elements (both internal and external to the system 100). This network interface 112 is well understood in the art. The network interface 112 can communicatively couple the control circuit 108 to the wireless network 114 and whatever other networks 114 may be appropriate for the circumstances. The control circuit 108 may make use of cloud databases and/or operate as part of or in conjunction with a cloud computing platform. As can be seen, the control circuit 108 may be coupled to one or more databases.

While one control circuit 108 is shown, in some forms, the functionalities of the control circuit 108 may be implemented on a plurality of processor devices communicating on a network 114. In some forms, the control circuit 108 may be coupled to a plurality of network interfaces 112 and simultaneously respond to any number of queries from one or more user mobile devices 102.

The control circuit 108 accesses database(s) to determine the user's purchase history (or transaction history) of purchasing merchandise items. For example, in FIG. 1, the control circuit 108 may access an online purchase database 116 and an in-facility purchase database 118. It is generally contemplated that the database(s) may encompass multiple types of past merchandise purchases via various purchase channels so as to give a complete overview of the purchase history of the user. The multiple types of purchases may include: online purchases that were delivered to the user, in-facility purchases using the merchandise purchase application, in-facility purchases using a point-of-sale system other than the merchandise purchase application, and purchases that were ordered and picked up at retail facilities. FIG. 1 shows two databases 116 and 118 that provide purchase history information, but it should be understood that the databases can be combined and/or that multiple additional databases may be used to store different sources of purchase history.

Figure 7:
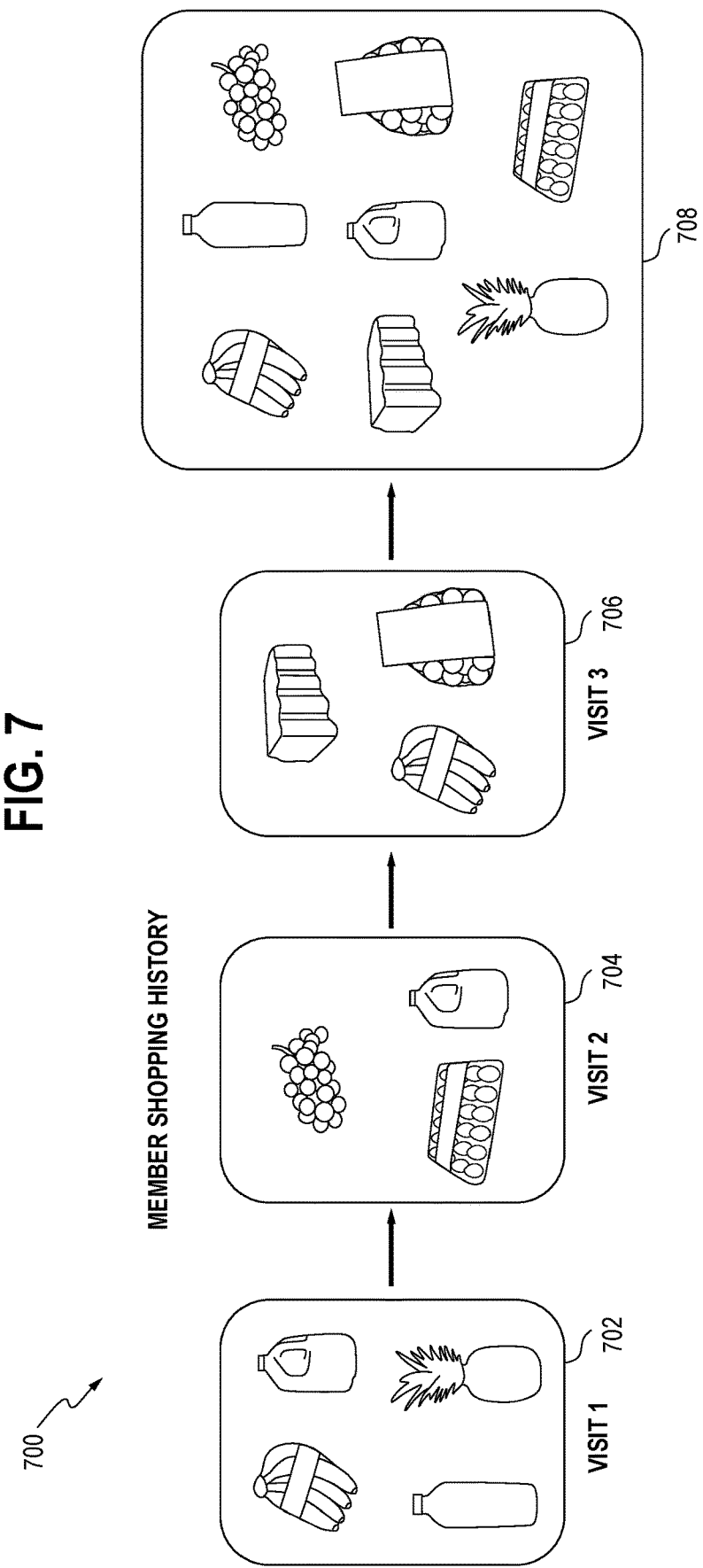
FIG. 7 comprises a schematic diagram in accordance with some embodiments.

The control circuit 108 further determines candidate items sold at the retail facility 101 to be considered for recommendation to the user based on the purchase history. In other words, candidate items are extracted from the user's past purchases/transactions. FIG. 7 shows a schematic diagram 700 illustrating a simplified determination of candidate items. As can be seen, in this example, three shopping visits are considered (Visit 1 (702), Visit 2 (704), and Visit 3 (706)), and the items purchased during each of the visits are aggregated to form a pool or list of candidate items 708. As can be seen, the total number of aggregated candidate items is less than the total number of items purchased during the visits due to some duplication of purchased items by the user. Further, as should be understood, the three visits are not necessarily all in-facility visits but may include a visit via a different purchase channel, such as, for example, an online visit. In addition, it is contemplated that the user's purchase history may be determined for a limited time period prior to the accessing of the databases 116 and 118, such as, for example, to include only visits occurring within the last 180 days, and/or may be focus on a specific type of merchandise, such as, for example, grocery items (as may be indicated by fields in databases 116 and 118).

Figure 8:
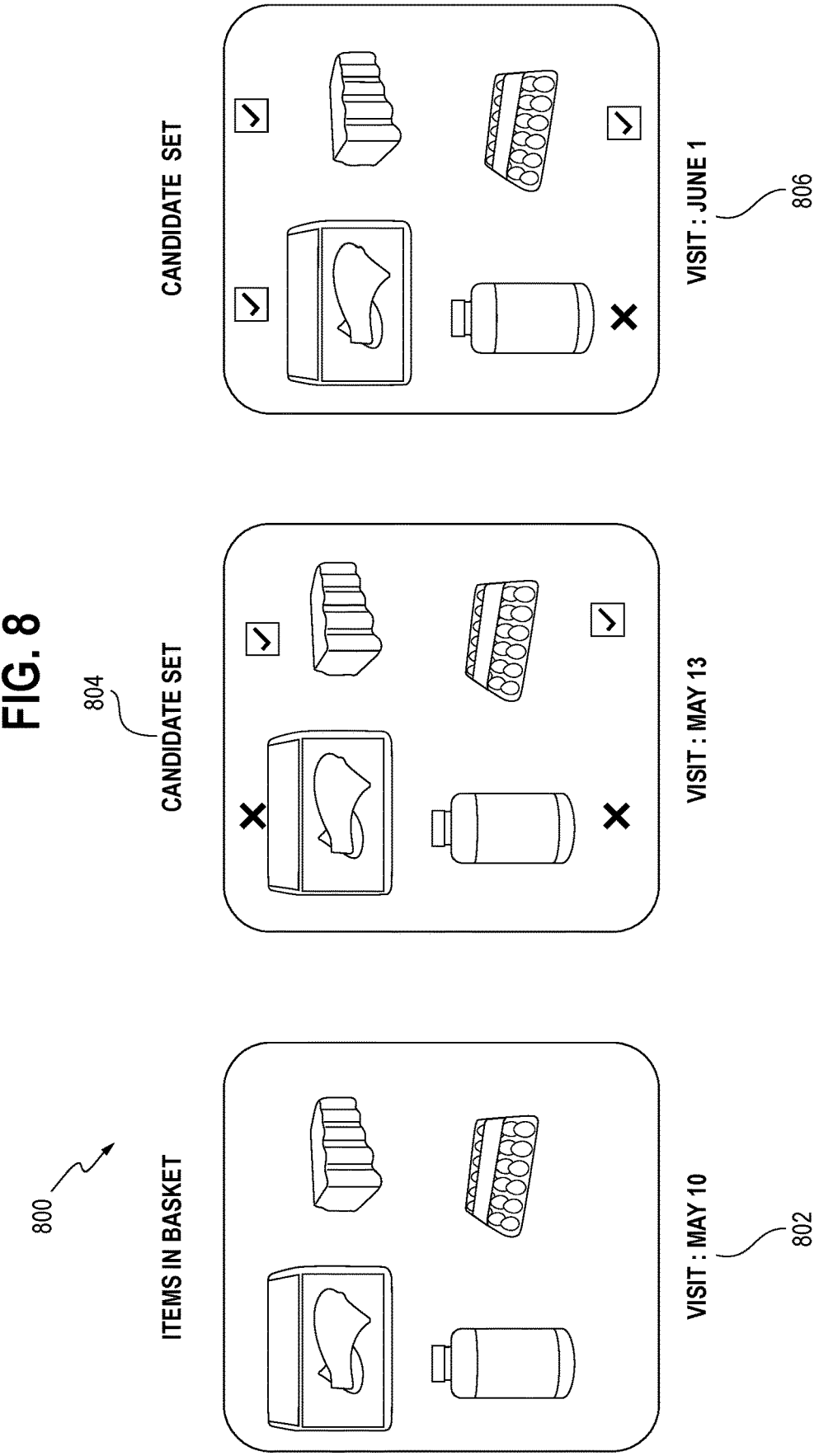
FIG. 8 comprises a schematic diagram in accordance with some embodiments.

The control circuit 108 also optionally eliminates from the candidate items one or more items of a subset of merchandise items that the user is unlikely to purchase based on a long time interval between purchases of each merchandise item in the subset of merchandise items (such as due to long consumption times). FIG. 8 shows a schematic diagram 800 illustrating a simplified determination of candidate items to be eliminated. During the visit on May 10 (802), the purchased items included bath tissue and vitamins. During the visit on May 13 (804), both of these items are eliminated as candidate items because the user is unlikely to be interested in purchasing these items again after such a short time interval. During the visit on June 1 (806), one of these items is again eliminated as a candidate item (the vitamins), while the other item (the bath tissue) is allowed in the pool of candidate items. After this time interval, the user may again be interested in purchasing bath tissue but is unlikely to be interested in vitamins, given the different expected intervals of time between purchases of each product.

In this regard, the subset of merchandise items that is optionally eliminated from consideration as candidate items may include items with varying lengths of time following a purchase before they may again be considered as candidate items. Thus, the control circuit 108 may not eliminate a long-unpurchased item that may have been included on a subset of merchandise items where the purchase history indicates that the long-unpurchased item has not been purchased for a certain length of time. It should also be understood that this elimination of certain potential candidate items may occur at the beginning or end of the determination of candidate items.

In one form, the frequency of days between purchases of the same product may be computed to identify a conservative threshold to filter products. For example, for paper towels, it may be determined that 95 out of 100 re-orders of the product have an interpurchase interval that is greater than 5 days, and further, it may be determined that 80 out of 100 re-orders for the product have an interpurchase interval that is greater than 16 days. In this example, it may be desirable to select the interpurchase interval of 16 days such that the user will not receive a recommendation for paper towels until at least 16 days after the last purchase of papers towels. Other interpurchase intervals may be selected, such as, for example, an even longer interval such corresponding to 50 out of 100 re-orders of the product. As should be understood, this interpurchase interval may vary for different products based on different consumption times.

Figure 9:
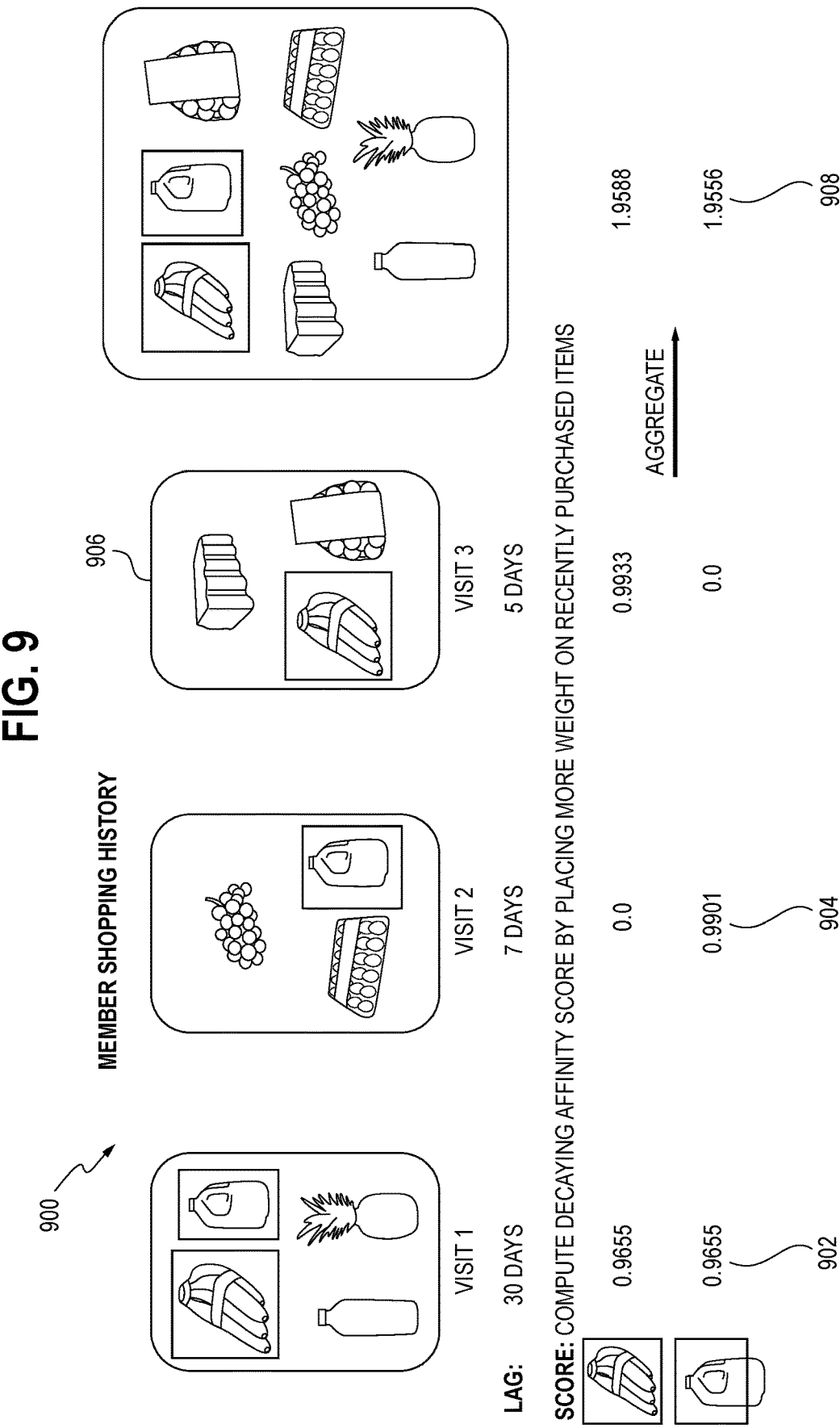
FIG. 9 comprises a schematic diagram in accordance with some embodiments.

The control circuit 108 determines an affinity score and ranking for each candidate item, and this affinity score and ranking are determined by the recency and frequency of purchase of the candidate items. FIG. 9 shows a schematic diagram 900 illustrating a simplified example of a determination of an affinity score. In this example, three visits are considered. Bananas were purchased during Visit 1 (902) and Visit 3 (906), while milk was purchased during Visit 1 (902) and Visit 2 (904). They each receive an individual affinity score for each visit, which are then aggregated 908. More weight is placed on recently purchased items, which results in a slightly higher total aggregate score for the bananas than for the milk.

In this form, it is generally contemplated that this weight will be determined by a decaying function that places more weight on recent purchases. It is desirable to provide a balance that combines recency of purchases while also helping the user recall items that may be of interest from less recent purchases. For example, this balance may be maintained by the use of various affinity decay functions, including the following types of decay functions:

$$\text{sig\_decay: } 1 - \frac{1}{1+e^{-(x-180)/36}}$$

$$\text{sig\_var\_decay: } \frac{1}{1+e^{(x-90)/18}}$$

$$\text{exp\_decay: } \frac{1}{e^x}$$

$$\text{log\_decay: } 1 - \frac{\log(1+x)}{\log 366}$$

$$\text{lin\_decay: } 1 - \frac{x}{366}$$

These examples include two types of sigmoid decay functions, an exponential decay function, a logarithmic decay function, and a linear decay function. The variable x is the number of days before the current transaction (the current shopping visit) occurred. It has been found that, in many circumstances, the first sigmoid function (sig_decay) may be the most preferred of these functions because it places the greatest emphasis on recent purchases. The first sigmoid function generates an S-shaped curve that places a relatively greater weight on recently purchased merchandise items. In other words, the control circuit 108 may preferably determine the affinity score of each item by a decaying, non-linear function that provides disproportionate weight to candidate items purchased more recently than other candidate items. In contrast, it has been found that, in some circumstances, the exponential decay function (exp_decay) may be the least preferred because it decreases rapidly and places the least relative weight on recent purchases.

Figure 10:
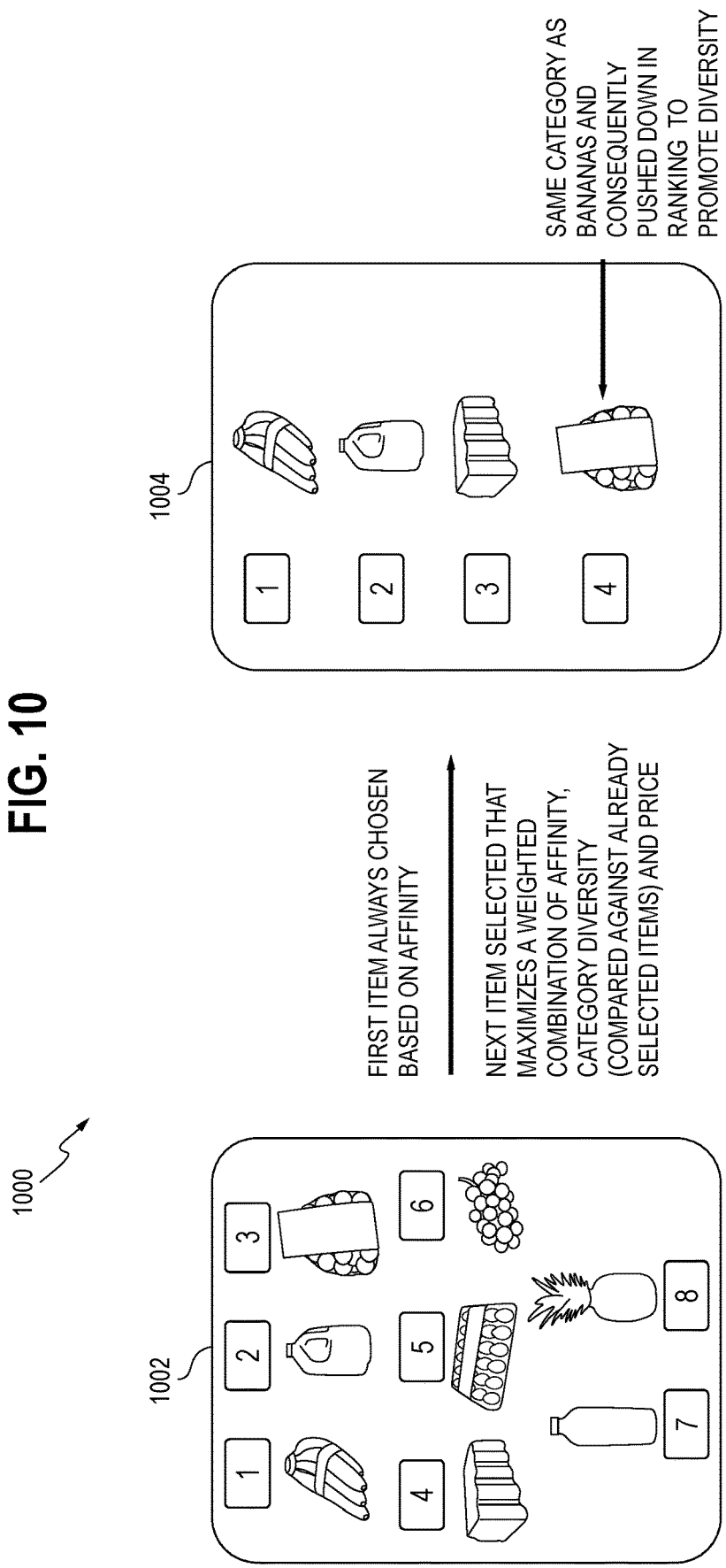
FIG. 10 comprises a schematic diagram in accordance with some embodiments.

The control circuit 108 then computes an item score and re-ranks the candidate items. The item score is determined by a weighted combination of the affinity score of the item (discussed above), the merchandise category of other candidate items, and the price of the item. FIG. 10 shows a schematic diagram 1000 illustrating a simplified example of how the merchandise category of other candidates is considered so as to increase the category diversity of the candidate items. In this example, after affinity scoring of the candidate items, the initial top candidate items 1002, in decreasing ranked order, are bananas, milk, oranges, and water containers. The oranges, however, are in the same merchandise category as the bananas because they are both types of fruit. So, the category diversity score for the oranges is lower than the category diversity score for the water containers. As a result, in this example, the water containers are re-ranked to a higher ranking than the oranges. The candidate items 1004 are re-ranked in the following decreased ranked order: bananas, milk, water containers, and oranges. In other words, the computation of the item score based on the merchandise category of other candidate items (category diversity) may be weighted to decrease the item score of a lower ranked candidate item that is in the same merchandise category as a higher ranked candidate item relative to other candidate items without this characteristic.

FIG. 11 shows a schematic diagram 1100 illustrating a simplified example showing how affinity, merchandise category, and price are all considered. The table on the left has columns for the candidate items 1102, average category diversity 1104, price 1106, and re-ranked scores 1108. Also, as can be seen, the table includes a bottom row that show examples of weights 1110 that can be applied to each of the affinity, average category diversity, and price factors that go into the total item score.

In this example, the affinity factor is given the greatest weight (0.7), the average category diversity is given an intermediate weight (0.27), and the price is given the least weight (0.03). In other words, the control circuit 108 may compute the item score of each item by applying a greatest weight to the affinity score of the item, an intermediate weight to the merchandise category characteristic, and a least weight to the price of the item. Also, as can be seen, the oranges have a lower average category diversity than the other two candidate items (the brown eggs and the pack of water containers). As was shown in FIG. 10, the oranges were in the same merchandise category (fruit) as an item with a higher affinity score and ranking (the bananas). In this example, the lower average diversity of the oranges contributed to them being in a lower re-ranked position than the water containers 1112. Thus, the control circuit 108 generates a final list/pool of re-ranked items.

In one preferred form, the control circuit 108 may utilize a greedy algorithm to address the re-ranking implementation. In one example, the greedy algorithm may be represented as:

---

Q = [ ], P = [ ]
Until size(Q) < 30:
   Choose the next item "I" from R that maximizes the score below:
     ArgMax [$\lambda$ * Affinity (U,I) − (1 − $\lambda$) * Sim (Q,I)]
   Add item "I" to Q;
   Add item "I" to P;
   Remove item "I" from R;
where
   Affinity (U,I) is the function to compute the user-to-item affinity score;
   Sim (Q,I) is the function to compute the closeness of item "I" to the cluster "Q";
   $\lambda$ is the hyperparameter to put weight on the functions for re-ranking;
   Q is the cluster of items;
   R are the candidate items extracted from the user purchases; and
   P is the final list of re-ranked items.

---

In this example, the control circuit 108 may start with a random item in the top ranks of the candidate items and reconstruct the recommendation list. In this example, the control circuit 108 considers each item I in the recall set R (the universe of candidate items). The control circuit 108 selects a certain number of items I with the highest scores for the final list of items P. In this example, a weight is assigned to the affinity function, which, in turn, determines the corresponding weight for the similarity function. As can be seen, the greater the similarity of an item I to the cluster of items Q, the lower its relative overall score (assuming the same affinity score). In this particular example, the price of the items is not taken into account (although it could be taken into consideration in other examples).

The control circuit 108 optionally determines whether the user should receive a recommendation based on past responses to recommendations and recency of purchasing merchandise. At this stage, the control circuit 108 optionally determines whether the user should receive a recommendation at all. It may determine that certain users currently prefer to avoid receiving recommendations to enable the checkout process to proceed smoothly and with little friction. The control circuit 108 may determine that the user has not responded to a certain number of past recommendations transmitted to the user's mobile device 102 (which may suggest that the user does not have a current interest in the recommendations). The control circuit 108 may then block transmission of recommended merchandise items to the mobile device 102 for a certain amount of time. In this regard, this feature may be applied as a snoozing feature, rather than a permanent block of recommendations. It may establish a certain amount of time during which recommendations are snoozed but after which the recommendations may be reinstituted. Also, this stage may be applied by the control circuit 108 either at the front end (before candidate items are generated) or at the back end of this approach for generating recommendations.

As an example, the user has consistently not responded to the recommendations during every visit in the last six months. In this example, the last visit of the user was last week. Recommendations to the user may be snoozed for one week, and the decision to make additional merchandise recommendations may reevaluated at the end of this 1-week snooze period.

Next, if not blocked, the control circuit 108 may cause the display of the recommended merchandise items for purchase by the user on the mobile device 102 unless a determination has been made that the user should not receive the recommendation. Examples of the display on the mobile device 102 are shown in FIGS. 5 and 6. In one form, the control circuit 108 may cause the display of a specific number of recommended merchandise items corresponding to the candidate items receiving the highest item scores. The control circuit 108 may display certain product information, such as a brief description of the product, the price, and/or the location of the product at the retail facility 101. The control circuit 108 may access some or all of this product information from one or more product databases 120. For example, regarding product location at the retail facility 101, the control circuit 108 may access a product database 120 identifying a location in the retail facility 101 where each recommended merchandise item is stocked and cause the display of the location of each recommended merchandise item in the retail facility 101 when causing the display of the recommended merchandise items for purchase by the user on the mobile device 102.

FIG. 12 shows a process 1200 for assisting a user with the purchase of merchandise at a retail facility. It is contemplated that a user employs a merchandise purchase application that is executed on the user's mobile device to purchase merchandise at the facility. The process 1200 transmits additional merchandise recommendations that may be of interest to the user's mobile device. The process 1200 may incorporate some or all of the components, operations, and concepts addressed above with respect to systems, screenshots, and schematic diagrams 100-1100.

At block 1202, a user is provided with a merchandise purchase application to facilitate purchase of merchandise items at a retail facility. The merchandise purchase application is configured to be executed on the user's mobile device. It is generally contemplated that, during shopping at the retail facility, the user may employ a camera on the mobile device to scan merchandise items to be purchased. The merchandise purchase application receives input regarding the merchandise items scanned and facilitates payment for the scanned merchandise items via the mobile device.

At block 1204, one or more databases are accessed to determine the user's purchase history of purchasing merchandise items. It is contemplated that a combination of purchase channels may be considered, such as, for example, online purchases that were delivered to the user, in-facility purchases using the merchandise purchase application, in-facility purchases using a point-of-sale system other than the merchandise purchase application, and purchases that were ordered and picked up at retail facilities. Further, consideration of the purchase history may be focused on a specific type of merchandise, such as, for example, grocery items.

At block 1206, candidate items sold at the retail facility are determined for consideration for recommendation to the user based on the purchase history. In one form, a universe of candidate items may be determined based on combining merchandise items purchased during all shopping visits. Further, in one form, these visits may be considered up to a certain time preceding the current shopping visit, such as, for example, up to 180 days preceding the current shopping visit.

At block 1208, optionally, certain candidate items are eliminated from consideration. More specifically, one or more items from a subset of merchandise items that the user is unlikely to purchase may be eliminated. The subset of items is based on a long time interval (or long consumption time) between subsequent purchases of each item. Further, these items may each have a variable length of time during which each item may not be considered for inclusion in the candidate items. For example, bath tissue may be eliminated from consideration for one or two subsequent visits, while a large bottle of vitamins may be eliminated from consideration for five or six subsequent visits.

At block 1210, an affinity score and ranking are determined for each candidate item. The affinity score and ranking are determined by the recency and the frequency of the purchase of the candidate items. In one form, the affinity score of each item may be determined by a decaying, non-linear function that provides disproportionate weight to candidate items purchased more recently than other candidate items.

At block 1212, an item score is computed and the candidate items are re-ranked. The item score is determined by a weighted combination of the affinity score of the item, merchandise category of other candidate items, and price of the item. The merchandise category may be considered so as to seek to reduce the number of recommended items that are in the same merchandise category (and to increase the category diversity). In one form, item score may be determined by applying the greatest weight to the affinity score, an intermediate weight to the merchandise category characteristic, and the least weight to the price of the item.

At block 1214, optionally, it is determined whether the user should receive a recommendation based on past responses to recommendations and recency of purchasing merchandise. In one form, if a user has not responded to past recommendations, further recommendations to the user's mobile device may be terminated entirely. In a more preferred form, however, the recommendations may be simply snoozed or suspended for a certain period of time. In other words, a user may stop receiving recommendations for a certain period of time, after which recommendations may be reinstituted.

At block 1216, recommended merchandise items are displayed for purchase by the user on the mobile device unless a determination has been made that the user should not receive the recommendation. These recommended merchandise items may be accompanied by relevant product information, such as, for example, a brief description, a price, and/or a location at the retail facility where the product is stocked. At block 1218, a specific number of recommended merchandise items having the highest item scores are displayed.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for assisting with in-facility purchases comprising:
   a mobile device including a sensing device for scanning merchandise items;
   a merchandise purchase application executed by the mobile device to facilitate purchase of merchandise items during a user's shopping experience at a retail facility, the merchandise purchase application configured to:
      receive input regarding merchandise items scanned at the retail facility by the sensing device;
      display, via an interface of the user device, a shopping cart page that includes the scanned merchandise items;
      facilitate payment for the scanned merchandise items by the mobile device at the retail facility; and
      receive a checkout indication indicating that the user is ready to purchase the scanned merchandise items; and
   a control circuit in communication with the merchandise purchase application and, in response to detecting the checkout indication, configured to provide the merchandise purchase application with additional merchandise items to present to the user for purchase during the user's shopping experience, the control circuit configured to provide the additional merchandise items by:
      accessing at least one database to determine the user's purchase history of purchasing merchandise items;
      determining candidate items sold at the retail facility to be considered for recommendation to the user based on the purchase history;
      determining an affinity score and ranking for each candidate item, the affinity score and ranking being determined by recency and frequency of purchase of the candidate items;
      computing an item score for each candidate item and re-ranking the candidate items, the item score for each candidate item being determined by a weighted combination of the affinity score of the candidate item, merchandise categories of the other candidate items, and price of the candidate item; and
      displaying, via the user interface, recommended additional merchandise items for purchase by the user on the mobile device unless a determination has been made that the user should not receive the recommendation, wherein the recommended additional merchandise items are displayed via the user interface overlapping the shopping cart page and includes location information for locating the recommended additional items in the retail facility.

2. The system of claim 1, wherein the control circuit is configured to:
   eliminate from the candidate items one or more items of a predetermined subset of merchandise items that the user is unlikely to purchase based on a time interval between purchases of each merchandise item in the predetermined subset of merchandise items, wherein the time interval is based on a consumption rate of the merchandise item.

3. The system of claim 1, wherein the control circuit is configured to:
determine whether the user should receive a recommendation based on past responses to recommendations and recency of purchasing merchandise.

4. The system of claim 1, wherein the at least one database includes a plurality of types of past merchandise purchases, the types comprising online purchases that were delivered to the user, in-facility purchases using the merchandise purchase application, in-facility purchases using a point-of-sale system other than the merchandise purchase application, and purchases that were ordered and picked up at retail facilities.

5. The system of claim 1, wherein the control circuit is configured to determine the affinity score of each item by a decaying, non-linear function that provides disproportionate weight to candidate items purchased more recently than other candidate items.

6. The system of claim 1, wherein the computation of the item score based on the merchandise category of other candidate items is weighted to decrease the item score of a lower ranked candidate item that is in the same merchandise category as a higher ranked candidate item relative to other candidate items without this characteristic.

7. The system of claim 1, wherein the control circuit is configured to compute the item score of each item by applying a greatest weight to the affinity score of the item, an intermediate weight to the merchandise category characteristic, and a least weight to the price of the item.

8. The system of claim 1, wherein the control circuit is configured to:
access a database identifying a location in the retail facility where each recommended additional merchandise item is stocked,
wherein the displaying the location information of each recommended additional merchandise item in the retail facility is based on the identification location from the database.

9. The system of claim 1, wherein the control circuit is configured to cause to display a predetermined number of recommended additional merchandise items corresponding to the candidate items receiving highest item scores.

10. The system of claim 1, wherein the control is configured to:
determine that the user has not responded to a predetermined number of past recommendations transmitted to the user's mobile device; and
block transmission of recommended additional merchandise items to the mobile device for a predetermined amount of time.

11. A method for assisting with in-facility purchases comprising:
executing, on a mobile device of a user, a merchandise purchase application to facilitate purchase of merchandise items during a user's shopping experience at a retail facility;
receiving, via the merchandise purchase application, input regarding merchandise items scanned at the retail facility using a sensing device of the mobile device;
displaying, on an interface of the user device via the merchandise purchase application, a shopping cart page that includes the scanned merchandise items;
facilitating payment, via the merchandise application, for the scanned merchandise items by the mobile device at the retail facility;
receiving, via the merchandise application, a checkout indication indicating that the user is ready to purchase the scanned merchandise items; and
by a control circuit in communication with the merchandise purchase application, and in response to detecting the checkout indication, providing the merchandise purchase application with additional merchandise items to present to the user for purchase during the user's shopping experience, the control circuit configured to provide the additional merchandise items by:
accessing at least one database to determine the user's purchase history of purchasing merchandise items;
determining candidate items sold at the retail facility to be considered for recommendation to the user based on the purchase history;
determining an affinity score and ranking for each candidate item, the affinity score and ranking being determined by recency and frequency of purchase of the candidate items;
computing an item score for each candidate item and re-ranking the candidate items, the item score for each candidate item being determined by a weighted combination of the affinity score of the candidate item, merchandise categories of the other candidate items, and price of the candidate item; and
displaying, via the user interface, recommended additional merchandise items for purchase by the user on the mobile device, wherein the recommended additional merchandise items are displayed via the user interface overlapping the shopping cart page and includes location information for locating the recommended additional items in the retail facility.

12. The method of claim 11, further comprising, by the control circuit:
eliminating from the candidate items one or more items of a predetermined subset of merchandise items that the user is unlikely to purchase based on a time interval between purchases of each merchandise item in the predetermined subset of merchandise items, wherein the time interval is based on a consumption rate of the merchandise item.

13. The method of claim 11, further comprising, by the control circuit:
determining whether the user should receive a recommendation based on past responses to recommendations and recency of purchasing merchandise.

14. The method of claim 11, wherein the at least one database includes a plurality of types of past merchandise purchases, the types comprising online purchases that were delivered to the user, in-facility purchases using the merchandise purchase application, in-facility purchases using a point-of-sale system other than the merchandise purchase application, and purchases that were ordered and picked up at retail facilities.

15. The method of claim 11, further comprising, by the control circuit, determining the affinity score of each item by a decaying, non-linear function that provides disproportionate weight to candidate items purchased more recently than other candidate items.

16. The method of claim 11, wherein the computation of the item score based on the merchandise category of other candidate items is weighted to decrease the item score of a lower ranked candidate item that is in the same merchandise category as a higher ranked candidate item relative to other candidate items without this characteristic.

17. The method of claim 11, further comprising, by the control circuit, computing the item score of each item by applying a greatest weight to the affinity score of the item, an intermediate weight to the merchandise category characteristic, and a least weight to the price of the item.

18. The method of claim 11, further comprising, by the control circuit:
   accessing a database identifying a location in the retail facility where each recommended additional merchandise item is stocked,
   wherein the displaying the location information of each recommended additional merchandise item in the retail facility is based on the identified location from the database.

19. The method of claim 11, further comprising, by the control circuit, causing to display a predetermined number of recommended additional merchandise items corresponding to the candidate items receiving highest item scores.

20. The method of claim 11, further comprising, by the control circuit:
   determining that the user has not responded to a predetermined number of past recommendations transmitted to the user's mobile device; and
   blocking transmission of recommended additional merchandise items to the mobile device for a predetermined amount of time.

* * * * *